March 24, 1925. 1,530,495
H. D. HUKILL
VEHICLE DOOR AND BRAKE DEVICE
Filed May 14, 1924 2 Sheets-Sheet 1
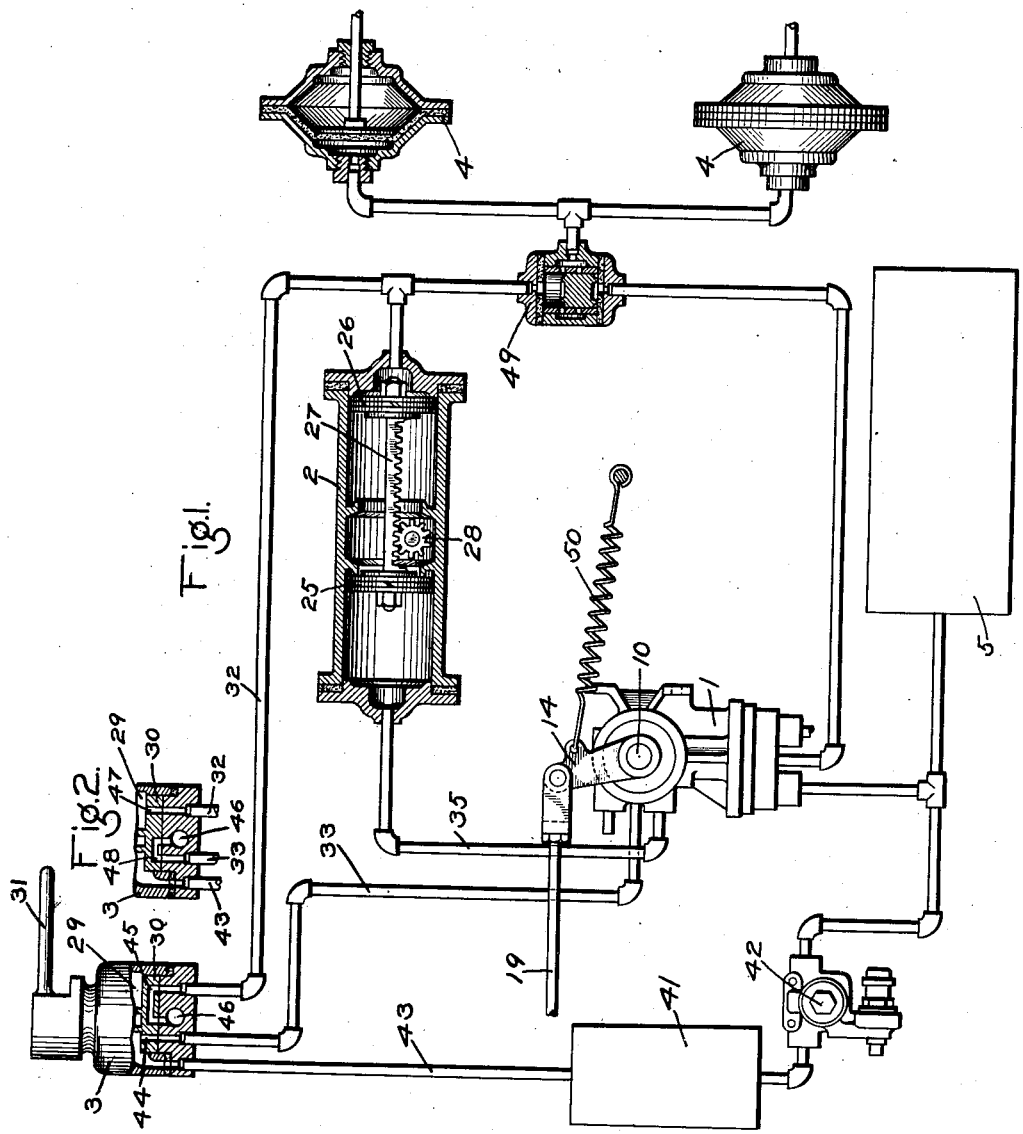
INVENTOR
HENRY D. HUKILL
BY
Wm. M. Cady
ATTORNEY March 24, 1925. 1,530,495
H. D. HUKILL
VEHICLE DOOR AND BRAKE DEVICE
Filed May 14, 1924 2 Sheets-Sheet 2
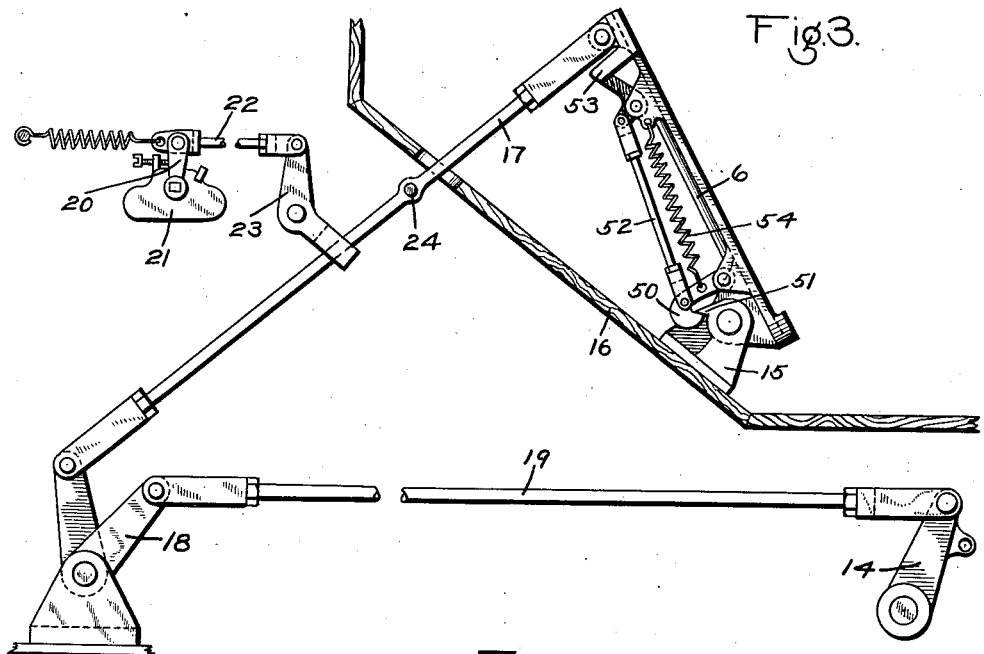
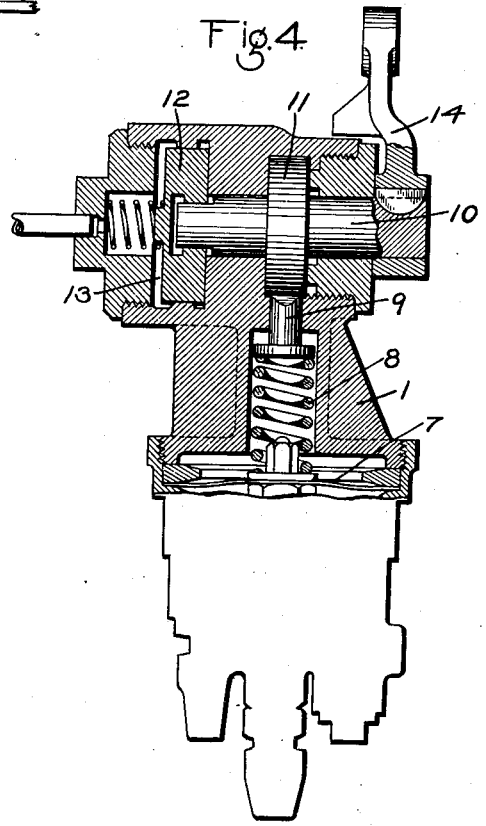
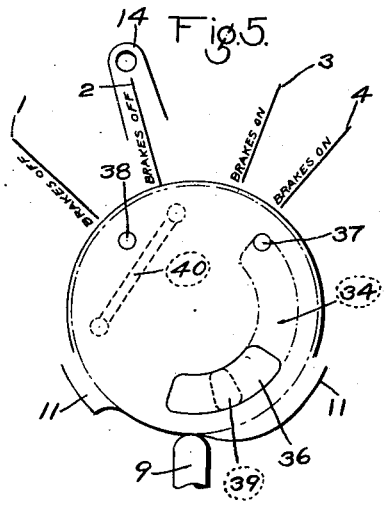
INVENTOR
HENRY D. HUKILL
BY *Wm. M. Cady*
ATTORNEY Patented Mar. 24, 1925.

1,530,495

UNITED STATES PATENT OFFICE.

HENRY D. HUKILL, OF PITTSBURGH, PENNSYLVANIA, ASSIGNOR TO THE WESTINGHOUSE AIR BRAKE COMPANY, OF WILMERDING, PENNSYLVANIA, A CORPORATION OF PENNSYLVANIA.

VEHICLE DOOR AND BRAKE DEVICE.

Application filed May 14, 1924. Serial No. 713,259.

*To all whom it may concern:*

Be it known that I, HENRY D. HUKILL, a citizen of the United States, residing at Pittsburgh, in the county of Allegheny and State of Pennsylvania, have invented new and useful Improvements in Vehicle Door and Brake Devices, of which the following is a specification.

This invention relates to control apparatus for motor vehicles and the principal object of my invention is to provide a motor vehicle control equipment in which the brakes, the doors, and the motor accelerator are controlled by the operation of a single foot pedal.

In the accompanying drawings; Fig. 1 is a diagrammatic view of a motor vehicle control equipment embodying my invention; Fig. 2 a sectional view of the door controlling valve in the position for opening the vehicle doors; Fig. 3 a side elevation of the foot pedal, showing the operating connections to the accelerator and the brake valve device; Fig. 4 a partial sectional view of the combined door and brake valve device; and Fig. 5 a fantom view of the door controlling valve and valve seat.

As shown in the drawings, the equipment may comprise a combined door and brake valve device 1, a door engine 2, a door controlling valve device 3, brake chambers 4, a reservoir 5 containing fluid under pressure, and a pedal device 6.

The combined door and brake valve device 1 may comprises a brake controlling portion which includes a flexible diaphragm 7 adapted to control the operation of valves (not shown) by which fluid under pressure is supplied to and released from the brake chambers 4. A spring 8 acts on the diaphragm 7 and engaging said spring is a member 9. An operating shaft 10 is mounted in the valve casing and secured to said shaft is a cam 11 which is adapted to engage the member 9.

At one end, the shaft 10 is operatively connected to a rotary valve 12 contained in valve chamber 13 and an operating arm 14 is secured to the other end of said shaft.

The pedal device 6 may comprise a pedal member pivotally mounted on a bracket 15 secured to the foot board 16 of the motor vehicle and pivotally connected to said pedal member is a rod 17 which extends through the foot board 16 and is pivotally connected to one arm of a bell crank 18. The other arm of said bell crank is pivotally connected to a rod 19 which extends and is pivotally connected to the arm 14.

Connected to the operating arm 20 of the usual engine accelerator 21 is a rod 22 which is pivotally connected to one arm of a bell crank 23. The other arm of said bell crank is slotted and straddles the rod 17, so that when the rod 17 is depressed by the pedal 6 to a sufficient extent, a pin 24, carried by the rod will engage the bell crank 23.

The door engine 2 may comprise a casing containing pistons 25 and 26 which are connected by a rack bar 27, and the teeth of said bar engage a pinion 28. Said pinion is operatively connected to the vehicle doors, so that turning of the pinion will open or close the vehicle doors.

The door controlling valve device 3 may comprise a casing having a valve chamber 29 containing a rotary valve 30 adapted to be operated by a handle 31. The valve 30 controls the admission and release of fluid under pressure to and from a door opening pipe 32 which leads to the door opening piston 26 of the door engine 2 and also the admission and release of fluid to and from a pipe 33 leading to the valve chamber 13.

The seat of the rotary valve 12 is provided with a cavity 34 which is connected to a pipe 35 leading to the door closing piston 25 and said cavity is provide with ports 36 and 37 opening at the seat. An atmospheric exhaust port 38 also opens at said seat. The rotary valve 12 is provided with a through port 39 and a cavity 40.

In order to supply fluid to the door controlling valve device 3 at a reduced pressure, an additional reservoir 41 is provided, which is supplied with fluid under pressure from the reservoir 5 through a pressure reducing valve device 42. The reservoir 41 is connected by pipe 43 to the valve chamber 29 of the door controlling valve device.

In operation, if the pedal 6 is held in such a position that the arm 14 assumes the position 2 shown in Fig. 5, the brakes will be released, since the member 9 is permitted by the cam 11 to move outwardly so as to relieve the spring 8 of pressure and when there is no spring pressure on the diaphragm 7, the valves controlled thereby will connect the brake chambers 4 to the atmosphere. In position 2, the through port 39 in the rotary valve 12 registers with port 36 in the valve seat, so that pipe 33 is connected to pipe 35, and thus the door engine 2 may be controlled by operation of the handle 31. When the handle is in the position shown in Fig. 1 fluid under pressure is supplied through port 44 on valve 30 to pipe 33 and thence to valve chamber 13 of the combined door and brake valve device 1. From valve chamber 13, fluid flows through port 39 in valve 12 to cavity 34 and thence through pipe 35 to the door closing piston 25 of the door engine. The door opening pipe 32, in this position, is connected through cavity 45 with exhaust port 46, so that fluid is vented from the door opening piston 26. The door engine is therefore moved to its door closing position, to hold the vehicle doors closed.

If it is desired to open the vehicle doors, the handle 31 is turned so that the valve 30 assumes the door open position, as shown in Fig. 2. In this position, fluid is supplied through port 47 to pipe 32, while fluid is vented from the pipe 33 through cavity 48 and exhaust port 46. The door engine 2 is then shifted to the position for opening the vehicle doors.

Pipe 32 is connected to one side of a double check valve device 49, and when fluid is supplied to pipe 32 to open the vehicle doors, the double check valve 49 will be shifted, so as to open communication from pipe 32 to the brake chambers 4. Fluid under pressure is therefore supplied to the brake chambers to effect an application of the brakes on the vehicle, whenever the door engine 2 is operated to open the doors.

When the pedal is in position corresponding with position 2 of Fig. 5, the pin 24 of rod 17 just engages the bell crank 23, and if it is desired to accelerate the engine of the vehicle, the pedal 6 is depressed, so that the pin 24 operates the bell crank 23 and thereby the accelerator.

During this movement of the pedal, the arm 14 is moved from position 2 toward position 1 and the cam 11 is so cut that in this movement, the member 9 is not operated and therefore the brakes remain released. The port 39 in valve 12 also remains in registry with the cavity 36, so that during this movement, the doors may be controlled as desired, by manipulation of the handle 31.

If it is desired to apply the brakes, the pedal 6 is allowed to rise, the upward movement being effected by the action of spring 50 which is connected to the arm 14, as shown in Fig. 1.

As the pedal 6 moves up, the arm 14 will move from position 2 toward position 3, as shown in Fig. 5, and in this movement, the cam 11 operates to depress the member 9, so that the spring 8 is compressed. The diaphragm 7 is then operated so as to effect the admission of fluid under pressure to the brake chambers 4.

In the above movement between positions 2 and 3, the port 39 remains in registry with port 36, so that the doors may be controlled by operation of the door controlling valve device 3.

If the operator should become incapacitated and the pedal 6 is released, said pedal will at once move to its extreme upward position, in which the arm 14 is moved to position 4. In this position, the brakes will be applied by operation of the member 9 by the cam 11 and cavity 40 in the valve 12 will connect port 38 with port 37. The door closing pipe 35 is thus connected to exhaust port 38, so that the door closing piston 25 will be subject to atmospheric pressure. If the door controlling valve device 3 is in its normal door closed position, as shown in Fig. 1, the door opening pipe 32 will be open to the exhaust and consequently both pistons 25 and 26 will now be subject to atmospheric pressure. The pressures on the pistons 25 and 26 being thus balanced, the vehicle doors may be opened by hand, to permit passengers to leave the vehicle, if desired.

Means are provided so that the operator may move the pedal to the brake applied position and then lock the same to prevent further movement to position 4.

For this purpose, a hooked latch 50 may be pivotally mounted on the pedal 6. Said latch is adapted to engage a detent 51 provided on the bracket 15 and connected to the latch is a rod 52, which is pivotally connected to a foot operable member 53. A spring 54 is connected to the latch 50 and tends to hold the latch out of engagement with the detent 51.

Normally, with the latch 50 held out of engagement with the detent 51, the member 53 extends above the level of the pedal 6 and if it is desired to lock the pedal in position 3, the member 53 is pressed by the foot to the position shown in Fig. 3, so that when the pedal 6 is raised to position 3, the latch 50 will engage the detent 51 and thus prevent further movement of the parts to position 4.

In this position, as before described, the brakes are applied, and the pedal being locked, the operator may remove his foot from the pedal without causing the parts to move to position 4.

Having now described my invention, what I claim as new and desire to secure by Letters Patent, is:—

1. In a motor vehicle control apparatus, the combination with a fluid pressure door engine for controlling the vehicle doors and a door valve device for controlling the fluid pressure for operating said door engine, of a brake valve device for controlling the fluid pressure brakes on the vehicle and means associated with said brake valve device for controlling communication from said door valve device to said door engine.

2. In a motor vehicle control apparatus, the combination with a fluid pressure door engine for controlling the vehicle doors and a door valve device for controlling the fluid pressure for operating said door engine, of a brake valve device for controlling the fluid pressure brakes on the vehicle and provided with an operating arm and a valve operated by said arm for controlling communication from said door valve device to said door engine.

3. In a motor vehicle control apparatus, the combination with a fluid pressure door engine for controlling the vehicle doors and a door valve device for controlling the fluid pressure for operating said door engine, of a brake valve device for controlling the fluid pressure brakes on the vehicle and provided with an operating arm and a valve operated by said arm for controlling communication through which fluid under pressure is supplied by said door valve device to the door closing side of said door engine.

4. In a motor vehicle control apparatus, the combination with a fluid pressure door engine for controlling the vehicle doors and a door valve device for controlling the fluid pressure for operating said door engine, of a brake valve device for controlling the fluid pressure brakes on the vehicle and means operated when the operator becomes incapacitated for operating said brake valve device to effect an application of the brakes and for balancing the fluid pressures on said door engine.

5. In a motor vehicle control apparatus, the combination with a fluid pressure door engine for controlling the vehicle doors and a door valve device for controlling the fluid pressure for operating said door engine, of a brake valve device for controlling the fluid pressure brakes on the vehicle and means operated when the operator becomes incapacitated for operating said brake valve device to effect an application of the brakes and for venting fluid from the door closing side of said door engine.

6. In a motor vehicle control apparatus, the combination with a fluid pressure door engine for controlling the vehicle doors and a door valve device for controlling the fluid pressure for operating said door engine, of a brake valve device for controlling the fluid pressure brakes on the vehicle and provided with an operating arm and a valve operable by said arm and having one position for connecting said door valve device to the door closing side of said door engine and another position for releasing fluid from the door closing side of said engine.

7. In a motor vehicle control apparatus, the combination with mechanism for controlling the brakes and the vehicle doors, of a foot pedal for controlling the operation of said mechanism and separately operable means associated with the foot pedal for locking said pedal in a predetermined position.

8. In a motor vehicle control apparatus, the combination with mechanism for controlling the brakes and the vehicle doors, of a foot pedal for controlling the operation of said mechanism, means for operating said mechanism to effect an application of the brakes upon release of said pedal, and means associated with said pedal for locking the pedal in a predetermined position.

9. In a motor vehicle control apparatus, the combination with a brake valve device for controlling the brakes, a door engine for controlling the vehicle doors, and a door valve device for controlling the fluid pressure for operating the door engine, of a valve operating with the brake valve device and having one position for connecting the door valve device to the door engine and another position for venting fluid from said door engine, a pedal, and means operated when the pedal is released for operating said brake valve device to apply the brakes and said valve to vent fluid from the door engine.

10. In a motor vehicle control apparatus, the combination with a brake valve device for controlling the brakes, a door engine for controlling the vehicle doors, and a door valve device for controlling the fluid pressure for operating the door engine, of a valve operating with the brake valve device and having one position for connecting the door valve device to the door engine and another position for venting fluid from said door engine, a pedal, means operated when the pedal is released for operating said brake valve device to apply the brakes and said valve to vent fluid from the door engine, and means for locking said pedal in a position to prevent movement of the brake valve device and said valve to the door engine venting position.

11. In a motor vehicle control apparatus, the combination with a brake valve device for controlling the fluid pressure for applying and releasing the brakes on the vehicle, of a door engine, a door valve device for controlling the fluid pressure on said door engine, a valve operating with said brake valve device and adapted in one position to connect said door valve device to said door engine while the brakes are applied by said brake valve device and in another position to vent fluid from said door engine while the brakes are applied.

In testimony whereof I have hereunto set my hand.

HENRY D. HUKILL.